(12) United States Patent
Garrison (10) Patent No.: US 6,577,869 B1
(45) Date of Patent: Jun. 10, 2003

(54) FREQUENCY RE-USE FOR TDD APPLICATIONS

(75) Inventor: G. Jack Garrison, New Westminister (CA)

(73) Assignee: Harris Broadband Wireless Access, Inc., Bellevue, WA (US)

(*) Notice: Subject to any disclaimer, the term of this patent is extended or adjusted under 35 U.S.C. 154(b) by 81 days.

(21) Appl. No.: 09/607,456

(22) Filed: Jun. 29, 2000

(51) Int. Cl.[7] ............................................. H04Q 7/20
(52) U.S. Cl. ........................ 455/447; 455/446; 455/509
(58) Field of Search .................................. 455/446, 447, 455/450, 509; 370/329

(56) References Cited

U.S. PATENT DOCUMENTS

| | | | | |
|---|---|---|---|---|
| 5,212,830 A | * | 5/1993 | Miller | 455/447 |
| 5,247,699 A | * | 9/1993 | Hartman | 455/447 |
| 5,365,571 A | * | 11/1994 | Rha et al. | 455/447 |
| 5,396,646 A | * | 3/1995 | Miller | 455/447 |
| 5,668,610 A | * | 9/1997 | Bossard et al. | 725/62 |
| 5,901,356 A | * | 5/1999 | Hudson | 455/447 |
| 6,002,935 A | * | 12/1999 | Wang | 455/447 |
| 6,275,704 B1 | * | 8/2001 | Dixon | 455/446 |
| 6,304,762 B1 | * | 10/2001 | Myers et al. | 455/562 |
| 6,418,316 B2 | * | 7/2002 | Hildebrand et al. | 455/447 |

* cited by examiner

*Primary Examiner*—Charles N. Appiah
(74) *Attorney, Agent, or Firm*—Duane Morris LLP (57) ABSTRACT

The inventive cellular reuse plan uses a tessellating grouping of cells to form a pattern, which is then repeated to form a larger cell cluster. The invention uses a uniformly rotated set of identical or substantially identical cell assignments within a mosaic repeat pattern. The mosaic pattern uses several different cell types. Each cell type comprises a different set of frequency assignments. The different cell types are then arranged in the mosaic pattern. The cells may be represented as shapes in the pattern, e.g. hexagonal or square shapes. Each particular cell in the pattern has adjoining cells that are of a different type than the particular cell. Adjacent cells of the same type have their sector channel assignments rotated with respect to each other such that the common channels are not parallel with respect to each other.

31 Claims, 4 Drawing Sheets

FREQUENCY RE-USE FOR TDD APPLICATIONS

RELATED APPLICATIONS

The present application is related to U.S. Pat. No. 6,016, 313, entitled "SYSTEM AND METHOD FOR BROADBAND MILLIMETER WAVE DATA COMMUNICATION," issued Jan. 18, 2000, U.S. patent application Ser. No. 09/434,832, entitled "SYSTEM AND METHOD FOR BROADBAND MILLIMETER WAVE DATA COMMUNICATION," filed Nov. 5, 1999, and U.S. patent application Ser. No. 09/327,787, entitled "MULTI-LEVEL INFORMATION MAPPING SYSTEM AND METHOD," filed Jun. 7, 1999, the disclosures of which are hereby incorporated herein by reference.

TECHNICAL FIELD

This invention relates in general to high data rate (broadband) radio frequency communications, frequency re-use cellular plans that minimize the interference sensitivity of Time Division Duplex (TDD) transmission, as well as, minimize the interference sensitivity of Frequency Division Duplex (FDD) transmission.

BACKGROUND

In the past, high speed information communication between processor-based systems, such as local area networks (LAN) and other general purpose computers, separated by significant physical distances has been an obstacle to integration of such systems. The choices available to bridge the physical gap between such systems have not only been limited, but have required undesirable tradeoffs in cost, performance, reliability, and service deployment time.

One group of historically available communication choices includes such solutions as the utilization of a standard public switch telephone network (PSTN) or multiplexing signals over an existing physical link to bridge the gap and provide information communication between the systems. Although such solutions are typically inexpensive to implement, they include numerous undesirable traits. Specifically, since these existing links are typically not designed for high speed data communication, they lack the bandwidth through which to communicate large amounts of data rapidly. As in-building LAN speeds increase to 100 Mbps, the local PSTN voice grade circuits even more markedly represent a choke point for broadband metropolitan area access and therefore are becoming a less and less desirable alternative. Furthermore, such connections lack the fault tolerance or reliability found in systems designed for reliable transmission of important processor-based system information.

Another historically available group of communication choices is found at the opposite end of the price spectrum than those mentioned above. This group includes such solutions as the utilization of a fiber optic ring or point to point microwave communication. These solutions are typically cost prohibitive for all but the larger users. The point to point systems require a dedicated system at each end of the communication link which lacks the ability to spread the cost of such systems over a plurality of users. Even if these systems were modifiable to be point-to-multipoint, to realize the economy of multiple system use of some system elements, the present point-to-point microwave systems would not provide broadband data services but rather traditional bearer services such as T1 and DS3. Furthermore these systems typically provide a proprietary interface and therefore do not lend themselves to simple interfacing with a variety of general purpose processor-based systems.

Although a fiber optic ring provides economy if utilized by a plurality of systems, it must be physically coupled to such systems. As the cost of purchasing, placing, and maintaining such a ring is great, even the economy of multi-system utilization generally does not overcome the prohibitive cost of implementation.

SUMMARY OF THE INVENTION

The problem addressed by the invention is the limited spectrum available for use. The invention provides for dense re-use of frequencies in the spectrum while still providing desirable signal quality, e.g. high signal/noise ratio and/or low interference.

These and other objects, features and technical advantages are achieved by a system and method which provides a cellular reuse plan. The invention allows for a tessellating (repeating in the form of a mosaic pattern) grouping of cells that have controlled carrier to interference limits that meet acceptable carrier to interference (C/I) levels. The invention uses geometry theory in the grouping of the cells, (see Introduction to Geometry, by H. S. M. Coxeter, Wiley, $2^{nd}$ edition 1969, which is incorporated herein by reference). The invention uses a uniformly rotated set of identical or substantially identical cell assignments within a mosaic repeat pattern. The rotated repeating cell is used because of practical limits on the number of available frequency assignments. The number of assignments is associated with the allocated bandwidth and required data throughput of subscribers. The preferred embodiment of the invention operates in line of sight (LOS) system, uses polarization discrimination between adjacent cell sectors (note that polarization works for non-line of sight also). The mosaic pattern uses several different cell types. Each cell type comprises a different set of frequency assignments. The different cell types are then arranged in the mosaic pattern. The cells may comprise hexagonal or square shapes, the mathematics for which are discussed in Advanced Mobile Phone Service, Bell Systems Technical Journal, January 1979, and Microwave Mobile Communications, by W. C. Jakes, IEEE Press, reissued 1993, both of which are hereby incorporated herein by reference. Note that other polygon shapes could be used, for example octagonal.

The preferred embodiment of the invention allows for the deployment of both FDD (frequency division duplex) and TDD (time division duplex) PMP (point to multipoint) cellular systems under conditions of controlled, and acceptable, levels of intra-system interference. For TDD systems, the invention has no burst synchronization requirement between cells, as well as no transmit/receive symmetric transmission requirement between different sectors in a cell or different sectors within a multi-cell system, i.e., outbound/inbound sector transmission duration can be dynamically adapted in each sector to meet user requirements.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
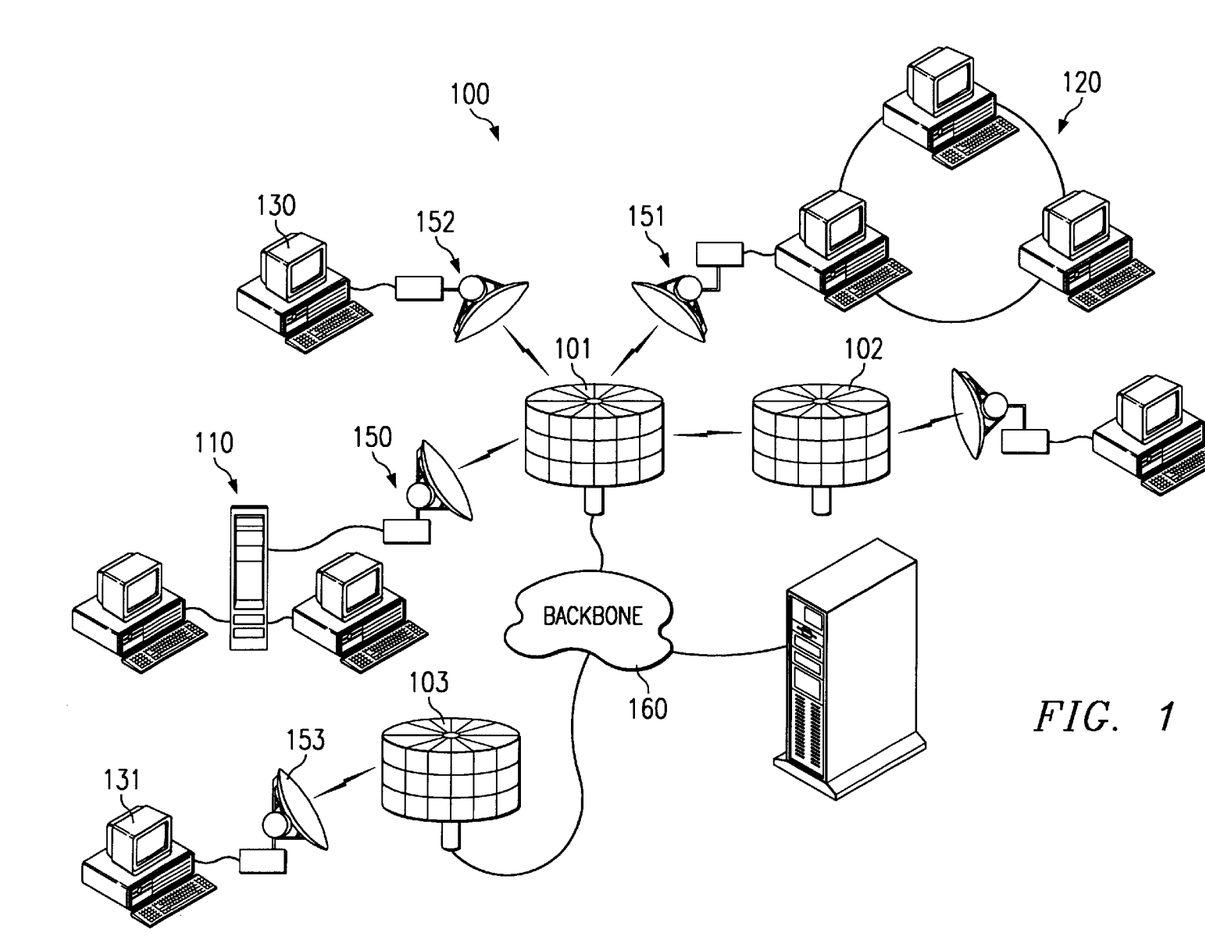
FIG. 1 illustrates the interconnection of processor-based systems of a preferred embodiment of the present invention.

The preferred embodiment of the present invention may be used in providing high speed data communication via a broadband air interface allowing data access between subscriber's remotely located systems although the concepts of the present invention may be utilized in any wireless communication system, for example, wireless LANs or telephonic systems. Referring to FIG. 1, it can be seen that such wireless communication may be utilized, for example, to provide high speed bridging of a physical gap between a plurality of processor-based systems, as illustrated by system 100. The processor-based systems may include local area networks (LAN), such as LANs 110 and 120, or individual computer systems, such as PC 130. It shall be appreciated that the processor-based systems utilizing the present invention may be general purpose computers, both standing alone and interconnected such as by a LAN. Furthermore, the system can connect other communication systems such as voice or video in combination with, or in place of, communication sourced by the above mentioned processor-based systems.

Systems bridged by the present invention may utilize a communication device, hereinafter referred to as a "node," for communicating with a centralized communication device also of the present invention, hereinafter referred to as a "hub." Still referring to FIG. 1, a hub is illustrated as element 101 and several nodes are illustrated as elements 150, 151, and 152 connected to LANs 110 and 120 as well as to PC 130.

Also, as illustrated in FIG. 1, such wireless communication may be utilized to provide high speed communication between a processor-based system, having a node coupled thereto, and communication backbone, such as backbone 160, through hub 101. It shall be understood that backbone 160 may be any form of communication means, such as a broadband fiber-optic gateway or other broadband data grade connection, T1 communications lines, a cable communication system, the Internet, or the like, physically connected to hub 101. Moreover, backbones, such as illustrated by backbone 160, may be utilized to interconnect a plurality of hubs into a communications network.

A communication network may also comprise a plurality of hubs, which is also illustrated in FIG. 1. Through such a network, a node, such as node 150, in direct communication with one hub, such as hub 101, may communicate with a node, such as node 153, in direct communication with another hub, such as hub 103. Such communication may be accomplished through the two hubs interconnection via a backbone, such as backbone 160. Of course, it shall be understood that intercommunication between hubs may be accomplished through information "back-hauling" via air gap communication between two hubs such as is illustrated with hubs 101 and 102. It shall be appreciated that a communications network may include any number of hubs in communication with other hubs, through such means as air gap or direct backbone interconnection, or the like. Information communicated from a node in direct communication with one hub may be routed through various such interconnections to a node in direct communication with any hub of the communication network.

Figure 2A:
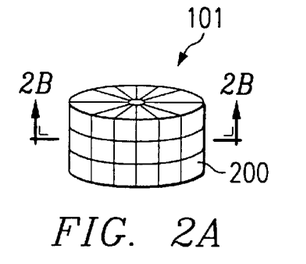
FIG. 2A illustrates an isometric view of the centralized communication array of a preferred embodiment of the present invention.

In a preferred embodiment, the hub of the present invention is comprised of a group of restricted beam width antennas (sector antennas although alternative embodiments may utilize a single multi beam antenna or other antenna systems). As a group, the sector antennas allow for omni directional transmission coverage of the hub transmission area. This area, ideally hexagonal in nature to facilitate complete coverage of an area without overlap, represents a cell. One such individual antenna element is depicted as antenna element 200 in FIG. 2A. The antenna elements are preferably narrow beam directional antennas having a pre-determined radiation pattern beam width although various configurations and/or combination of antennas may be used according to the present invention. These antennas are geometrically pointed to provide an omni directional composite radiation pattern. However it shall be understood that only the number of antenna elements required to communicate with a pre-determined number of remote systems, rather than an omni directional configuration, may be used, if desired. Typically, antenna sector beam widths can be selected rom 30, 45, 60 and 90 degrees. The combination of such highly directional antennas with high gain provides for improved frequency reuse and reduces the likelihood of intra cell and inter cell interference.

Figure 2B:
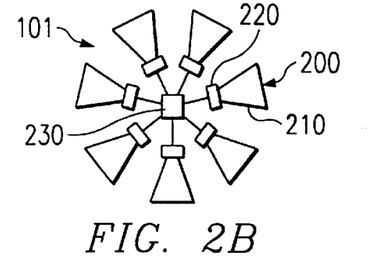
FIG. 2B illustrates a horizontal plane cross section view of the centralized communication array depicted in FIG. 2A.

In the preferred embodiment, where omni-directional coverage by hub 101 is to be utilized, individual antenna elements are arranged azimuthally, as illustrated in FIG. 2B, to cover a full 360 degree radius in a horizontal plane. It shall be appreciated that arranging antenna elements in this manner can provide blanket radio communication coverage radially about hub 101 by selecting the communication lobe of each antenna element to provide coverage in areas where the neighboring antenna elements are not so providing coverage.

Of course, as discussed above, the addition of antenna elements sufficient in number to provide a full 360 degree radiation pattern may be accomplished modularly as system use demands. It shall be appreciated that, even where ultimately 360 degree coverage is desired, the modular nature of the individual antenna elements provides an economic means by which to provide initially limited coverage to a developing area. For example, where only a few locations, or subscribers, within a geographic area covered by a particular hub site are desirous of communications by the present invention, a hub, including only those antenna elements necessary to service these subscribers, may be erected. Thereafter, as additional subscribers desire service within the service area of the hub, additional antenna elements may be added to the hub to provide service to their associated nodes. Ultimately the hub may be filled out with individual antenna elements to achieve communications in a full 360 degree radius about the hub.

For 30 degree sector assignment, it is preferable that a total of 12 individual antenna elements, each having a communication lobe with approximately a 30 degree azimuthal beam width, are utilized to accomplish 360 degree communication about hub 101. However, any number of individual elements could be utilized depending on individual design constraints, such as the presence of reflected waves and their associated multipath interference. Additionally, as discussed above, only the number of antenna elements needed for communication with certain identified nodes 150 may be used if desired.

Figure 3:
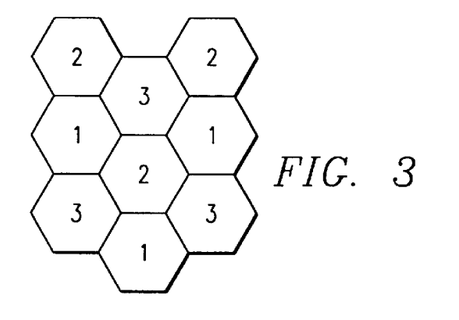
FIG. 3 depicts the inventive mosaic pattern of cell re-use.

The present invention relates to a cellular reuse plan. As shown in FIG. 3, each cell or hub of a preferred embodiment is arranged in a mosaic pattern comprising 9 cells. The pattern is comprised of three different cell types, namely 1, 2, and 3. This pattern provides that each particular cell is bordered only by cell types other than its own type. For example, cell 2 is adjoined with cells 1 and 3. This arrangement limits interference between the frequency assignments for each cell. Note that same cell types are spaced at a uniformly maximum separation distance from each other. The pattern of FIG. 3 could be replicated multiple times to produce a larger pattern. Also note that portions of the pattern can be used as needed. For example, a small cluster of two or three cells may be needed to satisfy the demands of a particular area. Also, when expanding or filling in a service area, portions of the pattern can be added to the existing cluster. For example, suppose the existing cluster comprises the pattern shown in FIG. 3, then service can be expanded by adding a cell of cell type 1 to the space above the upper center cell of cell type 3 and in between the two upper cells of cell type 2. The partial pattern additions would be added to the existing cluster in accordance with the cell pattern.

Figure 4:
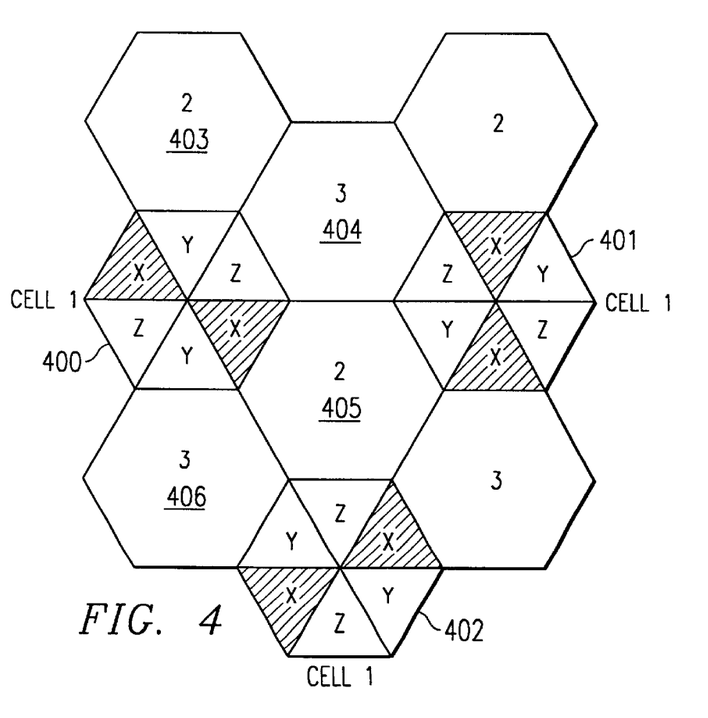
FIG. 4 depicts the inventive pattern of FIG. 3 populated with six sector cells of three different cell types, wherein each re-use of a cell type has sector rotation.

According to the present invention, the individual cell types are rotated as they are repeated in the pattern. This is shown in FIG. 4, wherein cell 1 is shown to comprise three frequency assignments, namely X, Y, and Z. Note that X could be a set of channels, thus set X is different from sets Y and Z. This arrangement has 60 degree sectors, with each cell having 6 sectors. When frequency assignments are repeated at 180 degrees, each cell type has 3 different assignments. Each time cell 1 is duplicated in the pattern, cell 1 is rotated by 60 degrees. For example, cell 400 has frequency X at the 0 degree position, while cell 401 has the X frequency at the 60 degree position, and cell 402 has the X frequency at the 120 degree position. Note that the 60 degree rotation is derived from the hexagonal cell structure. Other structures would have different rotations, e.g. a square would rotate 90 degrees. Note that to cell 400, cells 401 and 402 are adjacent cells, while cells 403, 404, 405, and 406 are adjoining cells. Note that additional adjacent cells and adjoining cells would be present for cell 400 if additional cells are added to the existing cluster that are around cell 400. The rotations minimize the direct facing of same frequency/same polarization sector assignment for the different cell patterns. In other words, the same channels in different cells are not transmitting/receiving in parallel directions. In addition to the distance separation, the off boresight antenna discrimination, i.e., avoidance of a particular frequency and polarization being directed at a sector having the same frequency and polarization, provides additional interference suppression.

Figure 5:
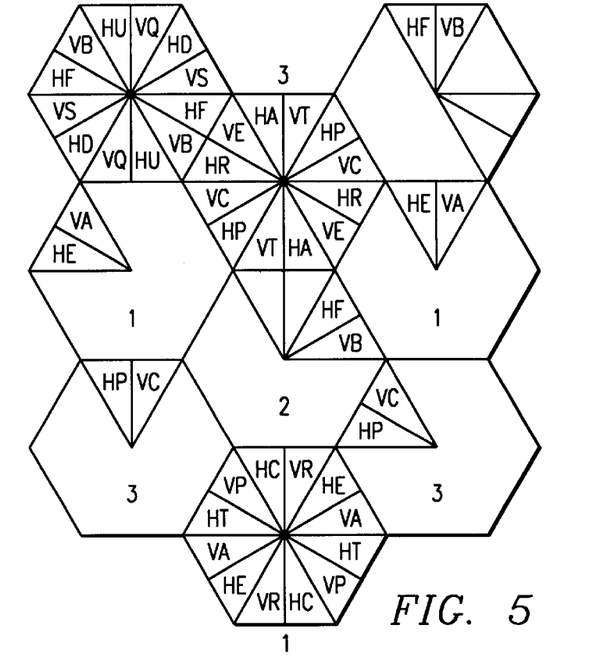
FIG. 5 depicts the inventive pattern of FIG. 3 populated with twelve sector cells of three different cell types, wherein each re-use of a cell type has sector rotation.

Another embodiment for a hexagonal structure is shown in FIG. 5. In FIG. 5, a total of 12 different frequency channels or channel sets are available. Each sector can have a unique set of channels (not limited to one channel) and the number of channels depends on the size of the frequency spectrum, and the required size of the channels. The size of the channels depends on data handling requirements of the system users. Thus, the more data users need to transmit, the larger the channel size that is required, and the fewer number of channels per spectrum. The channels are A, B, C, D, E, F, P, Q, R, S, T, and U in ascending sequence. For example, A is 1,380 Ghz, B is 1.381 Ghz, C is 1.382 Ghz, etc. Note that channels can be selected from one large spectrum or several smaller spectrums.

Cell types are selected from the available channels. Since an antenna pointed in one direction will not receive energy from the opposite direction, thus, the selected frequencies can be repeated within the cell, by offsetting them at 180 degrees. (Note that a back lobe is almost always present. Thus, their must be sufficient discrimination or attenuation of energy from the opposite direction, e.g., by use of a shield between the antennas and/or spacing that separates the two back to back antennas.) Thus, a cell having twelve 30 degree sectors will only need 6 different frequency/polarization assignments. Thus, adjacent sectors can be assigned frequencies that are spaced apart from each other on the spectrum. For example, cell one uses A, E, R, C, P, T. Thus, E is spaced from A and R on the channel spectrum. The spacing creates isolation between the channels, and therefore these channels can be placed next to each other in the cell. With a 6 channel requirement with spacing, and 12 total channels causes the formation of two basic cell types. Using polarization, adds another degree of freedom and allows for horizontal (H) and vertical (V) cell types, for a total of 4 different cell types. The horizontal and vertical polarization can be interspersed within each cell to provide for greater isolation between signals, and a further reduction of interference.

For example, this results in cell 1 comprising polarized channels as follows: VA, HE, VR, HC, VP, HT. For example, cell 2 comprises: VB, HF, VS, HD, VQ, HU. For example, cell 3 comprises: VC, HP, VT, HA, VE, HR. Cell 4 comprises: VD, HQ, VU, HB, VF, HS. Cells 1–3 are depicted in FIG. 5, with their repeat rotations. Cell 4 is not needed as only three cells are required for the mosaic pattern. Note that the same channels are repeated in the different cell types, but with different polarization, e.g. cell 1 includes VA, or vertically polarized channel A and cell 3 includes HA, or horizontally polarized channel A. This allows for re-use of the same channel frequencies. With a large enough channel spectrum, different sets of channels could be assigned to the different cell types, e.g. channel A is only used in cell 1.

Figure 6:
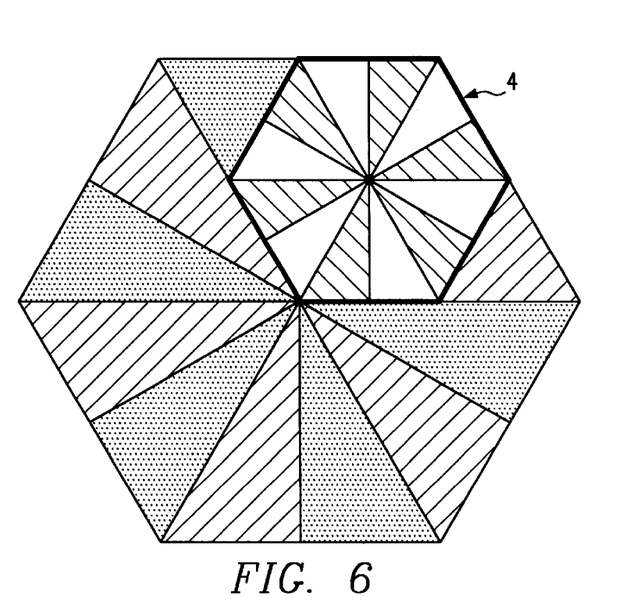
FIG. 6 depicts an overlay cell.

Reserve cell 4 can be used as an overlay cell. An overlay is added to the pattern for high density areas, e.g. the business district of a large city. The overlay can be a microcell, which is a lower power cell than a standard cell, as shown in FIG. 6, or the overlay cell may have the same power as the other cells in the pattern. Reserve cell types (sector assignments) can also provide interference free higher modulation index transmission into specific sectors. Reserve cells can provide resolution of co-channel interference conflicts across BTA (or business trading area which is an FCC term) boundaries by sector assignment substitution (thus, eliminating problems from point noise sources), and provide resolution of adjacent frequency/same frequency interference conflicts when multiple operators deploy on the same area, again by sector assignment substitution.

As stated earlier, a smaller channel size would yield more channels in the same size spectrum. Also a larger spectrum would result in more channels. A larger channel number system could then be developed. For example, an 18 channel system comprises channels: A, B, C, D, E, F, G, J, K, P, Q, R, S, T, U, W, X, and Y in ascending sequence. The larger number of channels would allow for more cell types. The additional cell types could be used as reserve cells or for developing a different mosaic pattern. For example, the cell types would be cell 1: VA, HG, VS, HC, VK, HU; cell 2: VB, HJ, VT, HD, VP, HW; cell 3: VC, HK, VU, HE, VQ, HX; cell 4: VD, HP, VW, HF, VR, HY; cell 5: VE, HQ, VX, HA, VG, HS; and cell 6: VF, HR, VY, HB, VJ, HT. In the pattern of FIG. 3, only three cell types would be needed, the other cell types could be used as reserve cells or for developing a different mosaic pattern (for example, by using types 4, 5, and 6 in place of types 1, 2, and 3, respectively).

Figure 7:
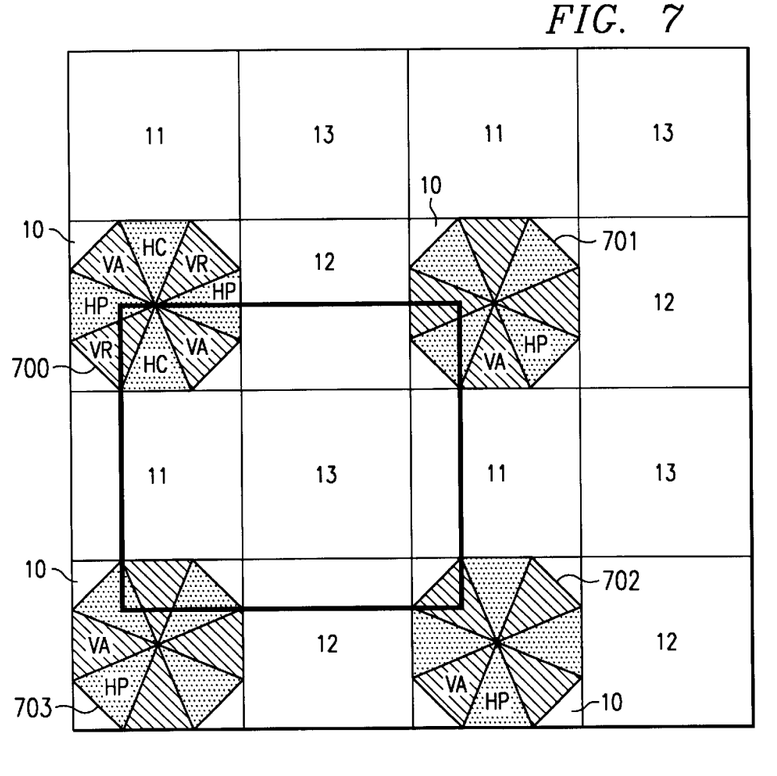
FIG. 7 depicts another inventive mosaic pattern populated with eight sector cells of four different cell types, wherein each re-use of a cell type has sector rotation.

FIG. 7 depicts an octagonal cell structure arranged in a square mosaic pattern with 45 degree sectors. This pattern requires 4 different cell types, namely, 10, 11, 12, and 13. This patten could be replicated multiple times to produce a larger pattern. Each cell type is bordered by different cell types. Each time a cell is re-used in the pattern, the cell is rotated. In FIG. 7, a total of a 8 different frequency channels are available. The number of channels depends on the size of the frequency spectrum, and the required size of the channels. The size of the channels depends on data handling requirements of the system users. Thus, the more data users need to transmit, the larger the channel size that is required, and the fewer number of channels per spectrum. The channels are A, B, C, D, P, Q, R, and S, in ascending sequence. Note that channels can be selected from one large spectrum or several smaller spectrums.

Cell types are selected from the available channels. Since an antenna pointed in one direction will not receive energy from the opposite direction, thus, the selected frequencies can be repeated within the cell, by offsetting them at 180 degrees. Thus, a cell having eight 45 degree sectors will only need 4 different frequencies. Thus, adjacent sectors can be assigned frequencies that are spaced apart from each other on the spectrum. With a 4 channel requirement with spacing, and 8 total channels causes the formation of two basic cell types. Using polarization, adds another degree of freedom and allows for horizontal (H) and vertical (V) cell types, for a total of 4 different cell types. The horizontal and vertical polarization can be interspersed within each cell to provide for greater isolation between signals, and a further reduction of interference.

For example, this results in cell 1 comprising polarized channels as follows: VA, HP, VR, HC. For example, cell 2 comprises: VB, HQ, VS, HD. For example, cell 3 comprises: VC, HR, VP, HA. For example, cell 4 comprises: VD, HS, VQ, HB. For simplicity only cell 1 is depicted in FIG. 7 with its repeat rotations. Note that in this arrangement cell 4 is actually needed for interference isolation, and is not available to be used as a reserve cell. Additional frequencies, e.g. L, M, N, 0, would have to be used for reserve cells.

Note that the rotations are different as well. For example, the sector assigned HP is rotated through locations 0, 45, 90, and 135 degrees in cells 700, 701, 702, and 703, respectively, which is the facets of the octagon.

Figure 8A:
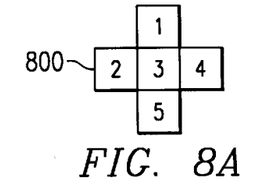
FIGS. 8A and 8B depict another inventive mosaic pattern populated with five different cell types.
Figure 8B:
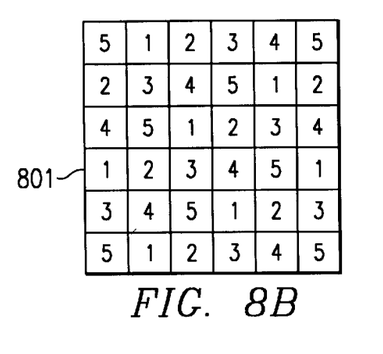

FIG. 8A depicts a cross-shaped pattern 800 that is using five different square cells. The cross-shaped pattern could be repeated as shown in FIG. 8B to form a larger cluster 801. Note that the cells could include 45 or 90 degree sector antennas. The different adjacent cells (for example each cell 1) would have their sectors rotated with respect to each other, wherein the rotation depends on the cell structure, e.g. 90 degrees.

Figure 9A:
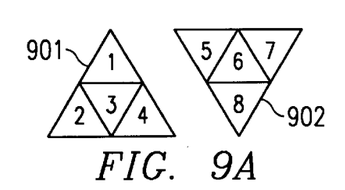
FIGS. 9A and 9B depict another inventive mosaic pattern populated with eight different cell types.
Figure 9B:
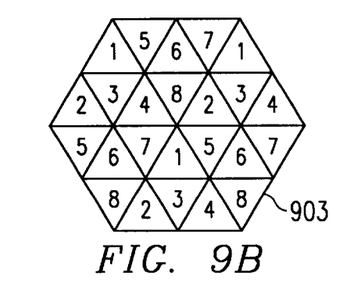

FIG. 9 depicts a triangular pattern 901 that is using four different triangular cells. To achieve good diversity, i.e. without having a particular cell type adjoin the same cell type, an additional pattern 902 that uses four different sectors from that of 901 is needed. These patterns could be repeated as shown in FIG. 9B to form a larger cluster 902. Note that the cells could include 60 or 120 degree sector antennas. The different adjacent cells (for example each cell 1) would have their sectors rotated with respect to each other, wherein the rotation depends on the cell structure, e.g. 120 degrees.

Further note that the structure of the cell, e.g. hexagonal, is not the actual radiation pattern for the transmission signals. Nor is the structure of the cell representative of the useable area of the radiation pattern. The structure of the cell is used to aid a designer of the cluster in laying out the different frequencies to be used in the cluster. The structure of the cell is selected based on the number of channels needed to satisfy users demand in a particular cell, and/or the antenna sector beam widths. For example, given a 360 degree circle, if 12 channels are required, then 30 degree sector beam antennas are used (360/12=30). The 12 channels, having a common denominator of 3, is preferably used with a hexagonal structure. Similarly if 45 sector beam antennas are to be used, then a total of 8 channels per cell would be available (360/45=8). Such a cell could be shown as an octagon or square. Thus, for a 60 degree antennas, a hexagon is preferable, while for 90 degree antennas, a square is preferable.

Similarly, the antenna sector beams shown in the FIGURES is not the actual radiation pattern of the antennas, but rather is an idealized version to aid a designer of the cluster.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for designing a pattern of cell sites that use a plurality of channels from a frequency band, wherein the pattern comprises a plurality of different cell types, and each cell site comprises a plurality of sectors, the method comprising the steps of:

assigning at least one channel of the plurality of channels to each sector of the plurality of sectors of each cell site;

arranging each cell in the pattern such that each particular cell is adjoining different cell types; and rotating an orientation of the sectors of each cell in the pattern such that the sectors of adjacent cells of the same cell type have different orientations;

wherein the step of assigning comprises the step of selecting adjoining channels for each cell from the plurality of channels from the frequency band; wherein the channels selected to be adjoining channels are spaced apart in the frequency band by a second plurality of channels.

2. The method of claim 1 further comprising the step of:
representing the cell sites in the pattern with a shape having a plurality of facets;
wherein each facet includes at least one sector.

3. The method of claim 2 wherein:
each facet includes one sector.

4. The method of claim 2 wherein:
each facet includes two sectors.

5. The method of claim 2 wherein:
the shape is a hexagon.

6. The method of claim 2 wherein:
the shape is a square.

7. The method of claim 2 wherein the step of rotating comprises the step of:
rotating the orientation of each adjacent cell site by at least one facet.

8. The method of claim 1 wherein the step of assigning comprises the step of:
assigning different channels to each of the different cell types.

9. The method of claim 1 wherein the step of assigning comprises the step of:
assigning the same channel to two cell types with one cell type having the same channel with vertical polarization and the other cell type having the same channel with horizontal polarization.

10. The method of claim 1 wherein the step of assigning comprises the step of:
assigning the same channel to sectors located on opposite sides of the cell.

11. The method of claim 1 wherein:
the cell sites are used in a frequency division duplex system.

12. The method of claim 1 wherein:
the cell sites are used in a time division duplex system.

13. The method of claim 1 wherein:
the cell sites are used in a point to multipoint communication system.

14. The method of claim 1 further comprising the step of:
forming a cluster of cell sites by repeating at least portions of the pattern.

15. A method for designing a pattern of cell sites that use a plurality of channels from a frequency band, wherein the pattern comprises a plurality of different cell types, and each cell site comprises a plurality of sectors, the method comprising the steps of:

assigning at least one channel of the plurality of channels to each sector of the plurality of sectors of each cell site;

arranging each cell in the pattern such that each particular cell is adjoining different cell types; and rotating an orientation of the sectors of each cell in the pattern such that the sectors of adjacent cells of the same cell type have different orientations;

wherein the step of assigning comprises the steps of:
assigning one channel of adjoining channels in each cell one of vertical polarization and horizontal polarization; and assigning the other channel of adjoining channels in each cell the other of vertical polarization and horizontal polarization.

16. A pattern of cell sites used in a communication system, the pattern comprising:

a plurality of different cell types having a plurality of channels from a frequency band, wherein each cell site includes a plurality of sectors;

wherein each cell in the pattern is arranged such that each particular cell is adjoining different cell types, and each cell has an orientation of the sectors such that the sectors of adjacent cells of the same cell type have rotated orientations; and, wherein adjoining channels for each cell are spaced apart in the frequency band by a second plurality of channels.

17. The pattern of claim 16 wherein:
the cell sites in the pattern are associated with a shape having a plurality of facets;
wherein each facet includes at least one sector.

18. The pattern of claim 17 wherein:
each facet includes one sector.

19. The pattern of claim 17 wherein:
each facet includes two sectors.

20. The pattern of claim 17 wherein:
the shape is a hexagon.

21. The pattern of claim 17 wherein:
the shape is a square.

22. The pattern of claim 17 wherein:
the orientation of each adjacent cell site is rotated by at least one facet.

23. The pattern of claim 16 wherein:
different channels are assigned to each of the different cell types.

24. The pattern of claim 16 wherein:
the same channel is assigned to two cell types with one cell type having the same channel with vertical polarization and the other cell type having the same channel with horizontal polarization.

25. The pattern of claim 16 wherein:
the same channel is assigned to sectors located on opposite sides of the cell.

26. The pattern of claim 16 wherein:
the cell sites are used in a frequency division duplex system.

27. The pattern of claim 16 wherein:
the cell sites are used in a time division duplex system.

28. The pattern of claim 16 wherein:
the cell sites are used in a point to multipoint communication system.

29. The pattern of claim 16 wherein:
a cluster of cell sites is formed by repeating at least portions of the pattern.

30. A pattern of cell sites used in a communication system, the pattern comprising:

a plurality of different cell types having a plurality of channels from a frequency band, wherein each cell site includes a plurality of sectors;

wherein each cell in the pattern is arranged such that each particular cell is adjoining different cell types, and each cell has an orientation of the sectors such that the sectors of adjacent cells of the same cell type have rotated orientations;

wherein one channel of adjoining channels in each cell is assigned one of vertical polarization and horizontal polarization; and the other channel of adjoining channels in each cell is assigned the other of vertical polarization and horizontal polarization.

31. A cluster of cell sites used in a communication system, wherein the cluster is formed by repeating at least portions of a pattern of cell sites, wherein the pattern comprises:

a plurality of different cell types having a plurality of channels from a frequency band, wherein each cell site includes a plurality of sectors;

wherein each cell in the pattern is arranged such that each particular cell is adjoining different cell types, and each cell has an orientation of the sectors such that the sectors of adjacent cells of the same cell type have rotated orientations; and, wherein the same channels with the same polarization in a cell and adjacent cells of the same cell type are not transmitted or received in parallel directions.

* * * * *